UNITED STATES PATENT OFFICE.

ARMAND MÜLLER JACOBS, OF MOSCOW, RUSSIA, ASSIGNOR TO OTTO WINCKLER, OF BRONXVILLE, NEW YORK.

PREPARING FABRICS FOR DYEING TURKEY RED.

SPECIFICATION forming part of Letters Patent No. 266,825, dated October 31, 1882.

Application filed July 24, 1882. (No specimens.)

*To all whom it may concern:*

Be it known that I, ARMAND MÜLLER JACOBS, a citizen of the Swiss Confederation, residing in the city of Moscow, Russia, have invented certain new and useful Improvements in Dyeing Fabrics, for which I have not hitherto made application for Letters Patent, either in the United States or in any foreign or other country; and I do hereby declare that the following is a full, clear, and exact description of the invention, which will enable others skilled in the art to which it appertains to make and use the same.

This invention relates to an improved process or method of dyeing fabrics, having for its object, among other things, great simplicity in the treatment of the goods or fabrics to be dyed; secondly, perfect uniformity and beauty of the produced colors; and, further, avoidance of any surplus or loss of material.

The objects of this invention are accomplished by the combination of the manipulations of oiling and aluming the fabrics with Turkey-red dye in one operation. For this purpose I use the peculiar property of tartaric acid, which, in combination with alumina and alkali, forms soluble double salts, by the solution of which by means of a surplus of alkali (hydro-oxide of ammonia) alumina is not precipitated. Such kind of solutions can be mixed with any desirable quantity of Turkey-red oil or alizarine assistants. (See Dr. Armand Müller Jacobs' United States Letters Patent No. 243,377, dated June 28, 1881, Letters Patent No. 243,378, dated June 28, 1881, and Letters Patent No. 245,633, dated August 16, 1881.) These mixtures are clear, and by means of the same cotton fabrics can be saturated, and after drying the latter are ready for the dye-bath. Fabrics thus prepared absorb most readily the alizarine of the dye-bath. The combination with sebacic alumina takes place during the cooking process which follows.

The aforesaid mordant mixture is composed as follows: Take one hundred kilograms of alumina and thirty-six kilograms of tartaric acid and dissolve these ingredients in a proportionate quantity of warm water, not above 60° Reaumur, adding, while thoroughly stirring, in small portions, the solution of forty kilograms of crystal sal-soda. Reduce the above to 5° to 10° Baumé, according to the shade of color wanted, and add to each one hundred kilograms thereof twenty to thirty kilograms of any desirable Turkey-red oil; or alizarine assistant of Dr. Armand Müller Jacobs' patents, with ammonia in small quantities, is added to the mixture, while thoroughly stirring it, until the mixture becomes clear. The quantity of ammonia needed is very small and can best be determined as used. The more Turkey oil used the more ammonia will be needed, and the amount of Turkey oil to be used depends upon the depth or shade of color desired. The above solution will give about three thousand liters of the mordant. With this mordant yarns and fabrics are saturated and thereafter dried in the air or in a hot room, then cleansed, as usual, either by means of a chalk bath, bran, low excrements, sour arsenic, phosphate of soda, or by any other known cleansing material, and then dyed in the alizarine bath with great care and precaution. It will be understood that each kind of soluble salts of ammonia, in combination with tartaric acid, as well as any desirable kind of Turkey-red oil or alizarine assistant, can be used for the preparation of this mordant. The proportions of alumina and Turkey-red oil, as well as the strength of concentration of the mordant, can be regulated by the dyer, according to the strength of color desired. This mordant, if thickened with any suitable thickening material, is also highly advantageous for calico-printing, as it has the effect to shorten and reduce the operations, as it does in this process.

Instead of tartaric acid, hydrate of alkali or soda can be used for the same purpose, as can also any other kind of organic bases which possess the property to dissolve alumina. For example, ethylamine, di and tri ethylamine, hydrate-oxide of tetraethylammonia, the butyl and amyl amines, and also the corresponding di and tri amines, as ethylendi and ethylentri amines, &c.; but such is not claimed in this application. In these different fluids the alumina is dissolved, and afterward sufficient quantities of Turkey-red oil or alizarine assistant are added. This process or method gives clear solutions, with which the cotton goods are to be saturated and then dried. After the volatilization of the bases the sebacic alumina remains on the fiber as the mordant body, and the goods are ready to be dyed.

I claim and desire to secure by Letters Patent—

The within-described process of preparing fabrics for dyeing Turkey red or alizarine, which consists in previously treating the fabric in a solution of ammonium-aluminum tartrate, whereby the oiling and aluming of the fabric are conducted at one operation.

ARMAND MÜLLER JACOBS.

Witnesses:
JNO. W. CULMER,
JEAN FISCHER.